United States Patent [19]

Schmidt

[11] Patent Number: 5,180,207
[45] Date of Patent: Jan. 19, 1993

[54] HEADREST FOR USE IN MOTOR VEHICLES HAVING PIVOT MEMBERS, RESILIENT STRIP AND FRICTION BANDS

[75] Inventor: Reinhard Schmidt, Lennestadt, Fed. Rep. of Germany

[73] Assignee: R. Schmidt GmbH, Lennestadt, Fed. Rep. of Germany

[21] Appl. No.: 733,031

[22] Filed: Jul. 17, 1991

[30] Foreign Application Priority Data

Jul. 17, 1990 [DE] Fed. Rep. of Germany ....... 9010690
Dec. 19, 1990 [DE] Fed. Rep. of Germany ....... 9017115
Jun. 18, 1991 [DE] Fed. Rep. of Germany ....... 9107485

[51] Int. Cl.⁵ ............................................. A47C 7/00
[52] U.S. Cl. ................................... 297/408; 297/410
[58] Field of Search ............................. 297/408, 410

[56] References Cited

U.S. PATENT DOCUMENTS 4,589,698  5/1986  Suzuki .
4,600,240  7/1986  Suman et al. ....................... 297/408
4,779,929  10/1988 Kuchemann ....................... 297/408
4,840,428  6/1989  Kobayashi et al. .

FOREIGN PATENT DOCUMENTS 175959   4/1986   European Pat. Off. ........... 297/408
3339361A1 5/1985  Fed. Rep. of Germany .
3339362  5/1985   Fed. Rep. of Germany ...... 297/408
3519351A1 12/1986 Fed. Rep. of Germany .
2634704A1 7/1988  France .
2064312A  11/1979 United Kingdom .

Primary Examiner—Kenneth J. Dorner
Assistant Examiner—James M. Gardner
Attorney, Agent, or Firm—Herbert Dubno; Yuri Kateshov

[57] ABSTRACT

Limited pivotability is imparted to a headrest for an automotive vehicle without having the resistance to pivoting change during the life of the headrest by providing a pair of pivot elements within the headrest which have brake stubs engaged by resilient strips functioning as brake shoes which bear upon these stubs and which are braced against the frame of the headrest to which the body of the headrest is attached. The support rods from the vehicle seat pass through openings in the bottom of the body to engage the pivot members.

17 Claims, 5 Drawing Sheets

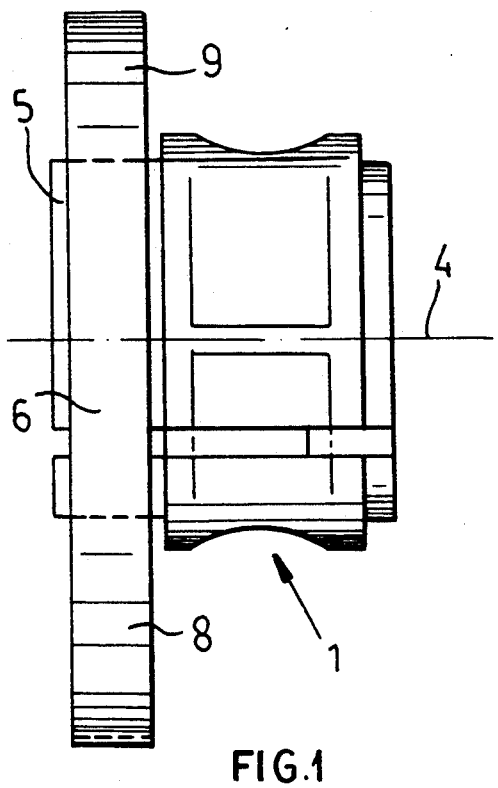
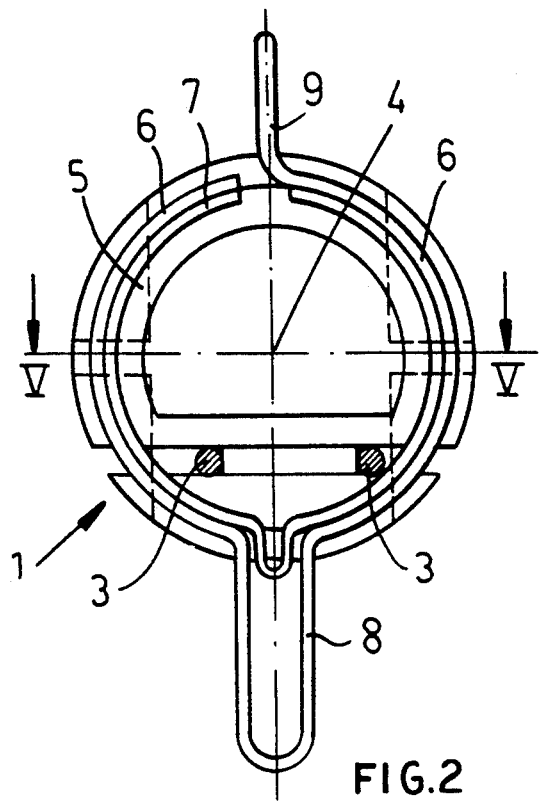
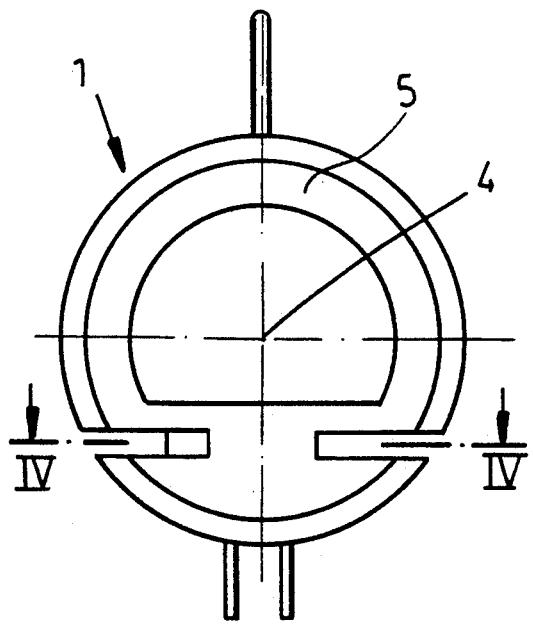
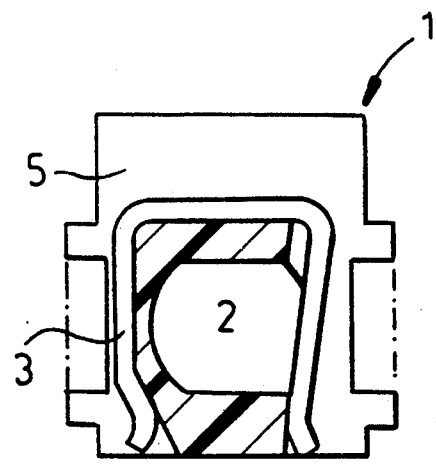
FIG.1
FIG.2
FIG.3
FIG.4

HEADREST FOR USE IN MOTOR VEHICLES HAVING PIVOT MEMBERS, RESILIENT STRIP AND FRICTION BANDS

FIELD OF THE INVENTION

My present invention relates to a headrest for use in an automotive vehicle and of the type which comprises a body of synthetic resin (plastic) for receiving the rod-like holders supporting the headrest and which can be comprised of plastic molded parts, generally injection molded parts forming downwardly open passages through which the support rods can be inserted and which are so constructed as to permit at least limited partial movement of the head support.

BACKGROUND OF THE INVENTION

Head supports of the aforedescribed type are known. They have, however, the disadvantage that the frictional retention of the relatively angularly desplaceable parts that permit the swinging or tilting movement have different degrees of clamping which may result from different manufacturing tolerances or otherwise and/or because the material frictionally engaging the same may be too soft or pliable and, with time, tends to become flowable. As a consequence, a sufficient frictional clamping of relatively movable pivotal parts cannot be ensured and it is not possible to provide an angular or pivotal adjustment of the headrest which can retain its position. As a consequence, the headrest may swing involuntarily out of a preset position in an undesirable manner.

OBJECTS OF THE INVENTION

It is the principal object of the present invention, therefore, to provide a head support for the purposes described, e.g. for use in automotive vehicles and which can be traversed by the support bars or rods rising from the seat back of an automobile seat, which will be free from the afore-described drawbacks.

A more specific object of the invention is to provide a head support for the purpose described which can be angularly adjustable at least limitedly and which will retain an adjusted position until intentionally readjusted by the user.

Still another object of the present invention is to provide a head support for the purposes described in which any angular adjustment of the head support can be maintained by a frictional braking which is independent of the material from which the body of the head support is constituted.

Still another object of my invention is to provide an angularly adjustable head support which can be retained in position and which is free from the drawbacks of earlier devices of this type.

SUMMARY OF THE INVENTION

These objects and others which will become more readily apparent hereinafter, are attained in accordance with the present invention by providing on the pivot part of the head support and coaxial with the pivot axis thereof, brake members which can engage the pivotal portion or are formed thereon, the brake members, bosses or stubs being engaged brakeshoe fashion by a resilient strip of material, for example, of plastic or preferably spring steel, at least engaging a major portion of the periphery of the angularly adjustable member, the resilient material strips being nonrotatably held on the head support.

By providing the brake stubs in combination with brakeshoe-like resilient material strips which are nonrotatable on the head support, it is possible to achieve a frictional connection between the brake support and the angularly displaceable part which allows the braking force to be adjusted upon manufacture by a corresponding selection of the materials of the resilient material strip or a correspondingly narrow tolerance between the material strips and the brake boss or stub, whereby the braking force can be completely independent of the material of the head support. This is because the resilient material strips do not form part of the head support or the head support frame, but rather are retained on the head support frame nonrotatably.

In a preferred embodiment of the invention, the pivot or swingable part together with the brake bosses or stubs are formed in one piece out of synthetic resin material, for example, a hard plastic. Most advantageously, the hard plastic is glass-reinforced polyamide (PA).

The brake bosses or stubs may have friction-enhancing surface formations.

Preferably, between the brake stub surface and the resilient material strips, a strip of friction enhancing material, for example, plastic, rubber or synthetic rubber material is provided.

It has been found to be highly advantageous to form the resilient material strips with at least one and preferably two formations, especially two diametrically opposite radially outwardly projecting formations which can engage the holding members of the headrest This configuration provides in a simple manner, an assurance against rotation of the headrest structure.

The resilient material strips are held on the respective members of the headrest frame which can be achieved easily with respect to tooling and by injection molding techniques.

The headrest can be fabricated, for example, from two half-shells so that the appropriately functioning parts can be introduced therein and the two half shells of the headrest can then be welded together or otherwise joined together so that the parts can function in the manner described. In a preferred embodiment of the invention, the resilient material strips can themselves be assembled from two half-shell strips that are connected at one end, for example, by being hooked together and at the other end, can have radially outwardly extending lugs which can be joined by a clamping device.

This arrangement enables the clamping device to set the prestressing force on the resilient material to that which is desired at manufacture for an increased or reduced braking force as may be desired. The clamping device can be a tension spring, for example a coil tension spring.

When the lugs of the strips opposite the lugs which are hooked together are bent away from one another, the angle defined between the lugs as thus bent away from one another, can with the same clamping device or tension spring, provide a higher or lower braking force on manufacture.

The resilient material strips can be clipped into the headrest frame parts.

Advantageously, the pivotal part at its side turned toward the brake stubs has slide directed coaxially thereto and in which a corresponding part of the headrest frame is receivable.

So that the headrest will not only be slidingly or steplessly adjustable but can be shifted into fixed positions, according to the invention, the brake stubs and the resilient material strips may have mating formations, for example, indexing recesses on the brake stubs and indexing projections on the resilient material strips.

According to another feature of the invention, the resilient material strips have two indexing pairs of such projections at diametrically opposite locations from which alternatively one or the other of the formations will be engageable in corresponding indexing recesses of the brake stubs. In the radial direction, pluralities of indexing recess pairs can be formed adjacent one another.

This configuration enables the desired indexed positions to be reliably achieved after the assembly in the frame halves of the headrest. Both stepless adjustment and indexing at selected angular positions is possible.

The diametrically opposite arrangement of paired recesses and projections ensures a particularly reliable indexing, since always one of the projection pairs can be received in a respective recess as desired.

It has been found to be advantageous to form at the mouth of the passage traversed by the rod-like holders or on both sides, hollow domes. Preferably, the domes extend in the longitudinal direction and have free ends surrounded by a clamping means, for example, spring rings. The clamping means can be introduced into circumferential grooves of the domes. With this arrangement, play between the rod-like holders and the pivot can be compensated so that any chattering effect or unsteadiness between these parts is precluded. Since the domes have narrowing cross sections, the cross-sectional dimensions can be so determined that the rod-like holders will be frictionally engaged in all cases, the friction effect being augmented by the clamping means, especially springs or a spring ring which may be utilized. Play between the pivot part and the rod-forming holder can be equalized.

The arrangement of a spring ring or the like in the circumferential groove at the free end of the dome, ensures its position upon assembly and during use of the headrest.

According to another feature of the invention, the resilient material strips are formed from identical half-shell strips mirror-symmetrically oriented with respect to the longitudinal axis and which are hooked together at both ends, the ends having radially outwardly directed projections.

In this embodiment, the two outwardly directed projections are so formed that they are radially outwardly bent and form-locked together by corresponding configurations of these ends. The result is a closed-ring configuration in which the spring force with which these strips bear is determined by their mutual engagement and interlocking.

In a preferred configuration, the resilient material strips are bent to a circular configuration and the end of the material strips are hooked together with one another, while prestressing the material strips.

In this case, one end of one of the strips can be bent against the curvature of the circular configuration and oriented so that it extends outwardly at an acute angle while the other end is offset and engages in an indexing channel of an end of the other strip segment.

It is especially preferred that the material have a resilient yielding zone which is formed by a radial somewhat U-shaped bend. The yielding zone can lie diametrically opposite the location at which the two strip segments are interlocked or interengaged with one another. This arrangement has the advantage that mounting is simplified since the assembly of the parts to lock the free ends can form a closed state with a predetermined prestress which is determined by the spring member surrounding the pivot member.

By the angle which the two interconnected lugs make with one another, it is possible to provide an automatic tool for closing the segments onto one another, the tool applying tangential forces to the two ends of the material strip so that a bend is formed to receive the bend of the other part until one bend engages over the other bend and the desired setpoint position is achieved. The connection can be effected, of course, manually, if desired, and the connection can be released manually or with the aid of tools or a machine.

More particularly, the headrest of the invention comprises a headrest frame; a headrest body on the frame; a pair of pivot members received in the body, engaged by the rods and formed with respective brake stubs, the pivot members defining a pivot axis about which the headrest body and frame are limitedly pivotal relative to the rods, the brake stubs being centered on the axis; and at least one resilient strip held nonrotatably in the frame and forming brakeshoe braced against each of the brake stubs and shaped to extend over at least a major portion of a periphery thereof for preventing unintentional angular displacement of the body relative to the pivot members.

BRIEF DESCRIPTION OF THE DRAWING

The above objects, features and advantages of my invention will become more readily apparent from the following description, reference being made to the accompanying drawing in which:

FIG. 1 is a side-elevational view of a first embodiment of the invention;

FIG. 2 is an end view thereof;

FIG. 3 is an end view of the embodiment of FIG. 1 from the opposite side;

FIG. 4 is a section taken along the line IV-IV of FIG. 3;

SPECIFIC DESCRIPTION

Figure 12:
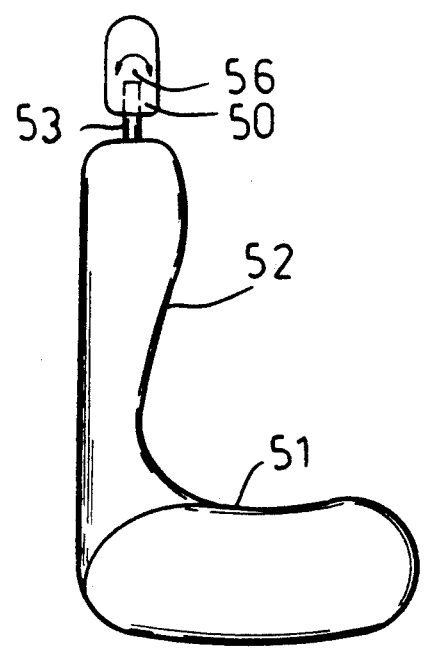
FIG. 12 a side view of the headrest mounted upon an automotive vehicle seat.
Figure 13:
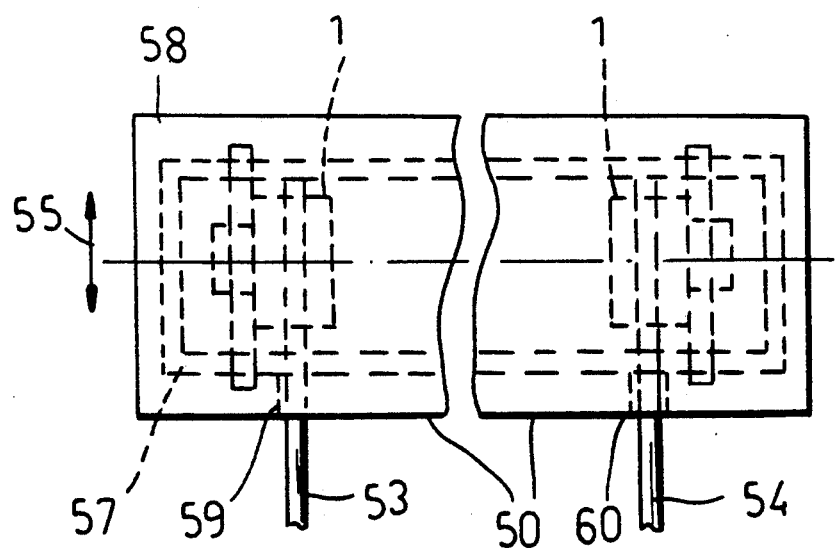
FIG. 13 is a front view of the headrest drawn to a larger scale.

Referring first to FIG. 12, an automobile seat 51 with a backrest 52 can be seen to be provided with a headrest 50 which is supported on a pair of rods 53 and 54 (see also FIG. 13). The rods pass through a pair of pivot members 1 seen only in broken lines in FIG. 13 which are so configured that the headrest 50 can be moved vertically (arrow 55) on these rods.

The headrest 50 can also rotate limitedly about an axis 56 corresponding to the axis 4 seen in FIGS. 1-5.

The frame of the headrest is represented diagrammatically at 57. The material of the headrest is likewise represented diagrammatically at 58 overlying and receiving the frame.

Since the principal features of the invention are those which relate to the pivot part 1 and the brake elements associated therewith, only these elements have been illustrated in FIGS. 1-11.

However, it is important to note that the headrest is generally a body of synthetic resin material provided with passages for the support rods 53, 54 which extend upwardly into the headrest from the lower side of the headrest. The passages and the headrest through which these rods are passed have been represented only diagrammatically in FIG. 13 at 59 and 60.

The rods 53 and 54 traverse the pivot parts 1 which are functionally held in the headrest and, specifically, pass through passages 2 therein and can be seized by respective springs 3 in the pivot parts 1. The springs 3 can cooperate with detent recesses in the respective rods 53 and 54.

The headrest itself is swingable about the axis 4, for example, defined by the pivot parts 1, at least limitedly. The angle of inclination of the headrest is thereby adjustable.

The pivot parts 1 are formed coaxially with their common pivot axis 4, brake supports or stubs 5, generally of the configuration of cylindrical bosses or stubs injection molded with pivot parts 1.

Each of the brake stubs 5 is peripherally engaged by a resilient material strip 6 which embraces the stub 5 over at least the greatest part of its periphery. This material strip 6 of each pivot part 1 is preferably composed of string steel or of fiber reinforced synthetic resin. The resilient material strips 6 are themselves held against rotation on the headrest as will be explained in greater detail hereinafter.

The pivot member 1, together with its brake stub or boss 5, in the embodiments disclosed, is constituted in one piece from an injection molded part (see especially FIGS. 1 and 5) from a synthetic resin material, especially a hard synthetic, for example glass fiber reinforced PA. The brake stub 5 can be formed on its surface with friction-enhancing surface formations, for example, roughening, protuberances, recesses, grooves or the like.

It is also possible and, indeed, preferred in accordance with the invention, to provide between the periphery of the brake stub 5 resilient material strip or strips 6, a strip or band 7 of friction-enhancing material, for example, a plastic, rubber or synthetic rubber.

The resilient material strips can be formed with two diametrically opposite radially outwardly extending projections or lugs 8, 9 which serve to prevent rotation of the resilient strips 6 and which, for that purpose are braced against the frame of the headrest, e.g. parts of the frame 57 illustrated in FIG. 13.

Figure 5:
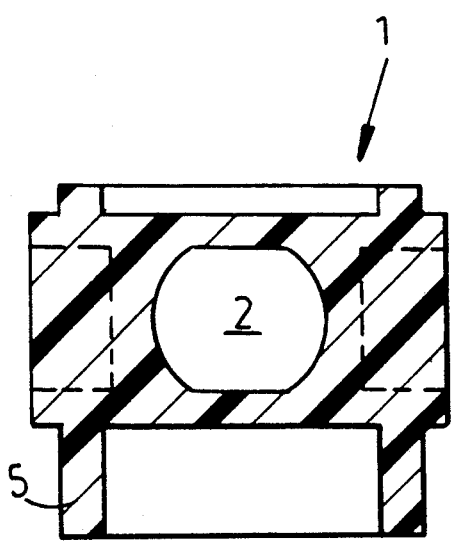
FIG. 5 is a section taken along the line V-V.
Figure 6:
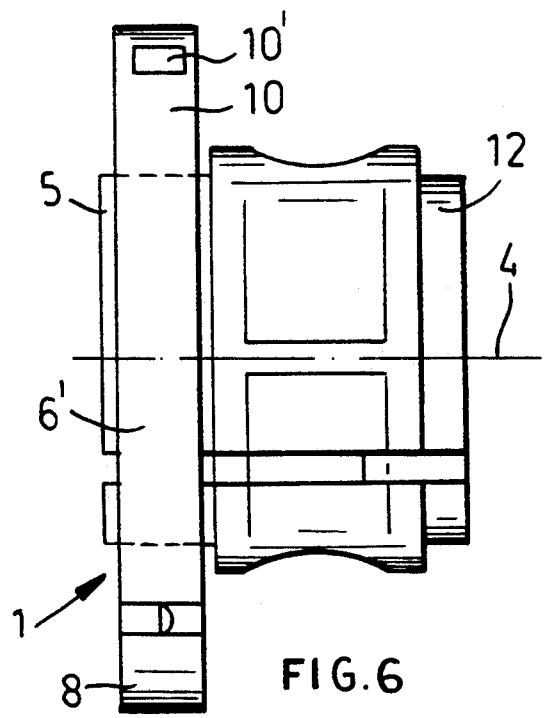
FIG. 6 is a side-elevational view of a second embodiment of the invention.
Figure 7:
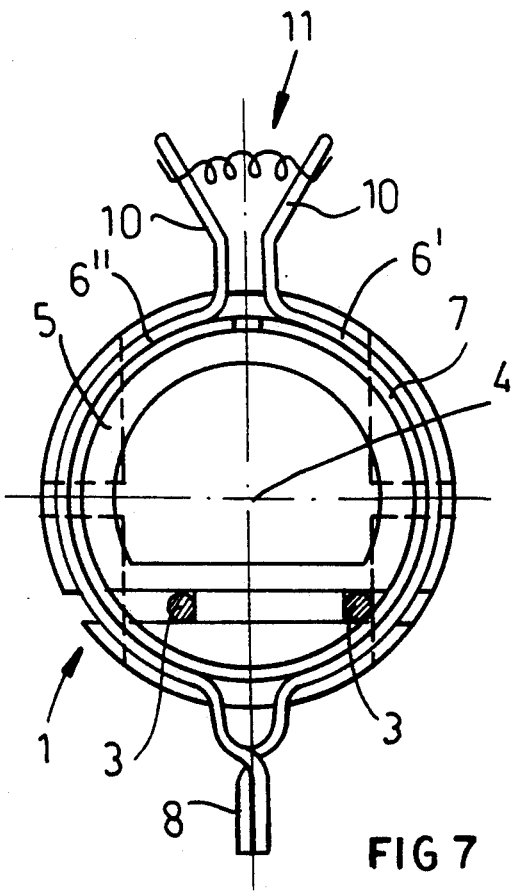
FIG. 7 is an end view thereof as seen from one side.
Figure 8:
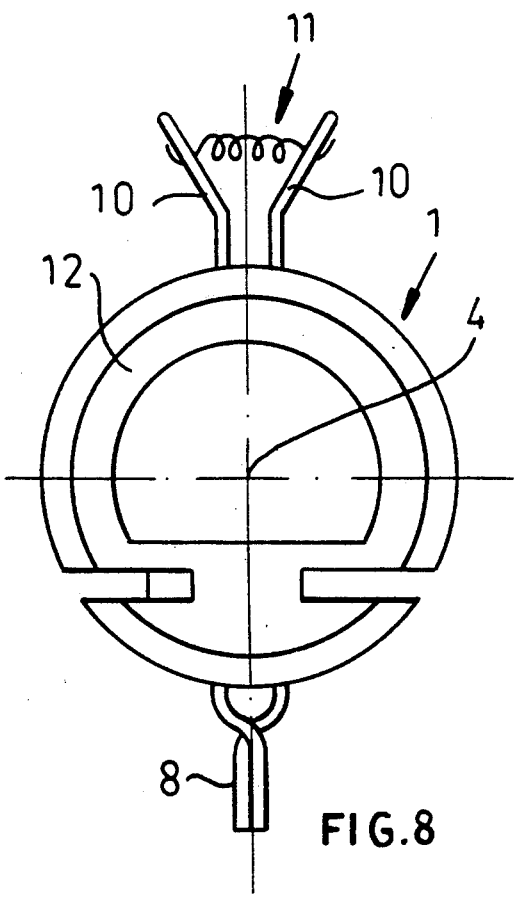
FIG. 8 is an end view of this second embodiment as seen from the opposite side.

In the embodiment of FIGS. 6-8, the resilient strips 6 are each formed from two half-shell strips 6', 6'' which are fastened together at their lower ends at which they can be hooked into one another. The hooked-together parts form the projecting lug 8 previously described.

At the opposite ends, the upper ends in the drawing, the strips have radially outwardly extending lugs 10 which are interconnected by a clamping device represented generally at 11. In the embodiment of FIGS. 6-8 this clamping device, tending to draw the lugs 10 together, is a coil-tension spring whose opposite ends are engaged in openings 10' (FIG. 6) in the lugs 10. To adjust the brake force applied by the strips 6', 6'' to the periphery of the brake stub 5, it is merely necessary to bend the lugs 10 further apart or toward one another to thereby alter the pretension on the spring 11 at the time of fabrication of the headrest.

It is also possible, according to the invention, to clip the resilient material strip 6 into the headrest frame parts so that the resilient material strips are nonrotatable.

For guidance of the pivot part 1 in its angular displacability relative to the frame and the remainder of the headrest, as the headrest is pivoted thereon, the part 1 can be received in a corresponding packet or recess in the headrest frame.

Figure 9:
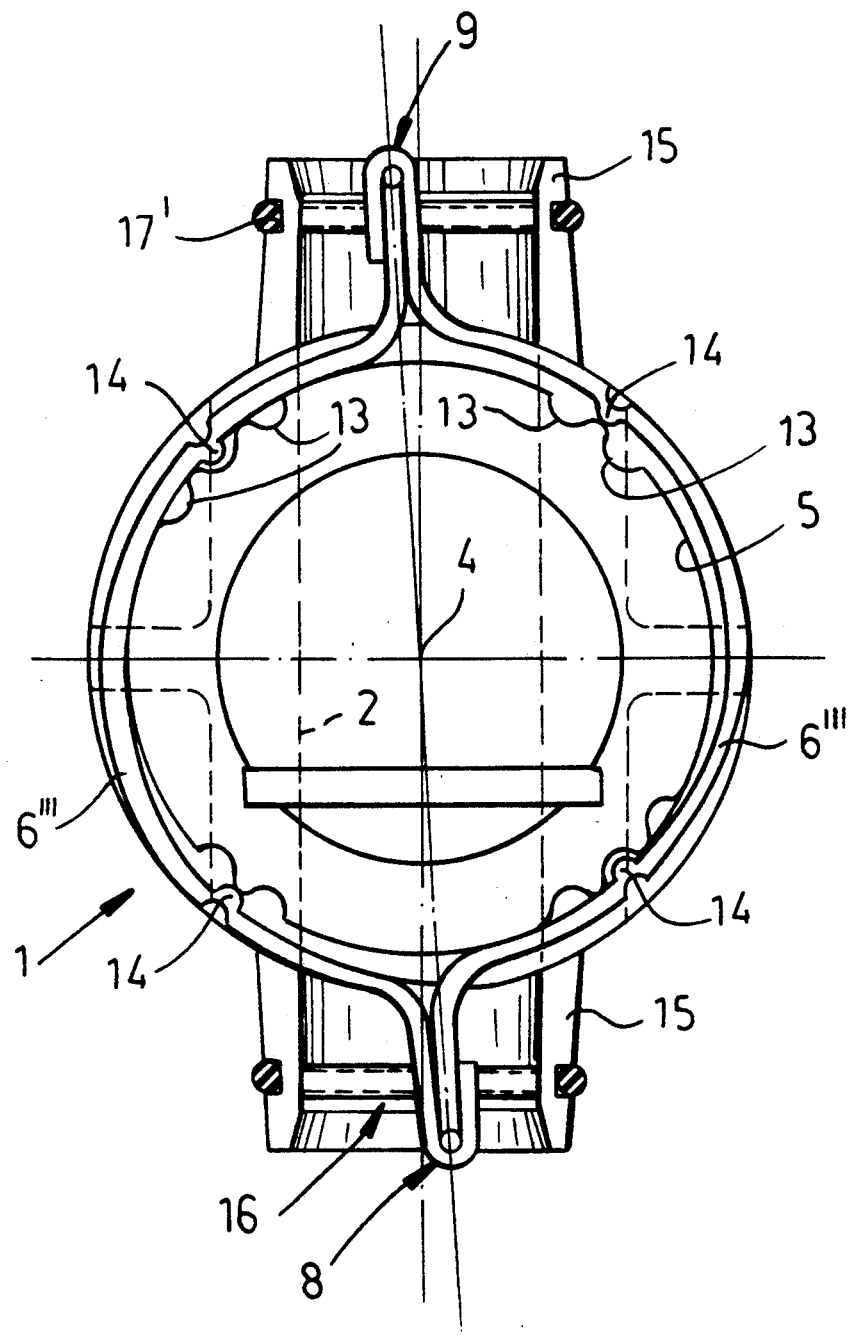
FIG. 9 is a view similar to FIG. 2 or FIG. 7, but illustrating another embodiment of the invention.

In the embodiment of FIG. 9, the brake boss 5 is shown to be provided with detent recesses 13 in which detent projections 14 of the resilient strip 6''' can engage.

The resilient material strips 6''' can be formed at diammetrically opposite regions with two indexing projection pairs, one projection of which can engage in an indexing recess while the other projection engages a portion of the brake boss 5 between projections. In other words, the projections of each pair alternatively engage in respective detent recesses while the other projections assume intermediate positions.

This arrangement allows fine angular adjustment of the pivot member 1 relative to the resilient strips 6, 6', 6'', 6''' and the frame with positive indexing of the two parts.

Also in this embodiment, it can be seen at the passage 2, on opposite sides of the pivot member 1, hollow dome elements 15 are formed which open toward the rod (not shown) and which converge toward their free ends in cross section.

The domes 15 are formed with slits 16 opening at the free ends and are surrounded by a tension element, for example a spring ring 17 which draws the ends of the domes together and constricts these ends around the rod. The spring rings 17 can lie in circular grooves 17' of the spring rings. The use of dome elements to group the rod suppresses any play between the rods and pivot elements.

Figure 10:
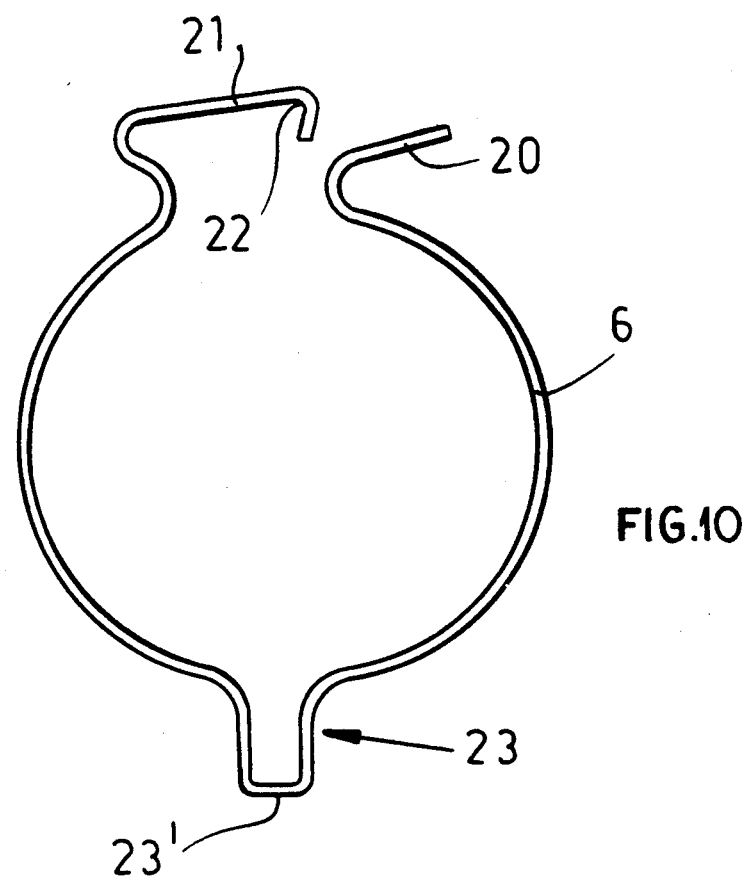
FIG. 10 is an elevational view of the resilient strip of the invention in accordance with a further embodiment, shown in the open position.
Figure 11:
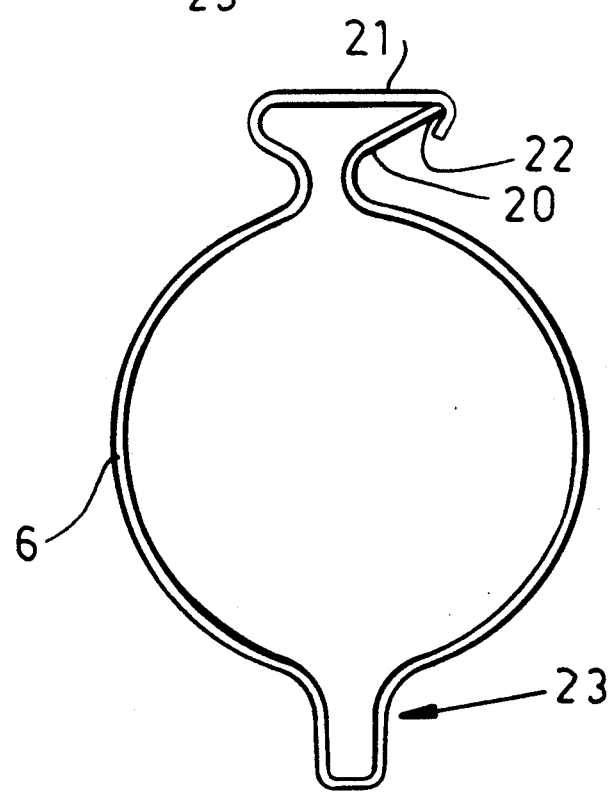
FIG. 11 is a similar view of the strip of FIG. 10 shown in a closed position.

FIGS. 10 and 11 show an embodiment of the resilient strip 6 of the invention which is bent generally to a circular shape and has free ends of the strip adapted to be hooked together. FIG. 10 shows the position of the strip before the ends are hooked together whereas FIG. 11 shows the strip after the hooking has been effected.

In this embodiment, one of the ends 20 is bent at an acute angle from the circular curvature outwardly while the other end 21 is stepped or offset and bent to have a channel 22 engaging the edge of the foreshortened end 20. These ends can be formed on segments of the strip 6 which can be hooked together at their diametrically opposite sides. Preferably, however, at the side diametrically opposite the hooked zone, the segments extend radially in the form of shanks of a U 23, the U having a bight 23'.

It will be appreciated that the invention is not limited to the embodiments illustrated by way of example, but is also intended to encompass all other configurations within the spirit and scope of the appended claims, including combinations shown in the drawing.

I claim:

1. A headrest for use in an automotive vehicle and adapted to be supported therein upon support rods, said headrest comprising:
   a headrest frame;
   a headrest body on said frame;
   a pair of pivot members received in said body, engaged by said rods and formed with respective brake stubs, said pivot members defining a pivot axis about which the headrest body and frame are limitedly pivotal relative to said rods, said brake stubs being centered on said axis;
   at least one resilient strip held nonrotatably in said frame and forming a brakeshoe braced against each of said brake stubs and shaped to extend over at least a major portion of a periphery thereof for preventing unintentional angular displacement of said body relative to said pivot members, said strip being composed of spring steel or synthetic resin material; and
   a band of friction-increasing material selected from the group which consists of plastic, rubber and rubber substitutes between said strip and the respective periphery of the respective brake stub.

2. The headrest defined in claim 1 wherein said pivot members, including said brake stubs, are composed of a hard synthetic resin material.

3. The headrest defined in claim 2 wherein said hard synthetic resin material is glass-fiber-reinforced polyamide.

4. The headrest defined in claim 1 wherein said brake stubs are formed along their peripheries with friction-increasing formations.

5. The headrest defined in claim 1 wherein each of said strips is formed from two half-shell strip segments hooked together at one end and formed at an opposite end with outwardly extending lugs, and a tension device drawing said lugs toward one another.

6. The headrest defined in claim 5 wherein said tension device is a coil tension spring.

7. The headrest defined in claim 5 wherein said lugs are bent away from one another.

8. The headrest defined in claim 1 wherein said strips are clipped in parts of said headrest frame.

9. The headrest defined in claim 1 wherein said pivot members are each formed on an axial end opposite the respective brake stub with a guide boss receivable in a corresponding recess formed in said frame.

10. The headrest defined in claim 1 wherein said peripheries are formed with indexing recesses and said strips have projections selectively receivable in said recesses.

11. The headrest defined in claim 1 wherein said members are formed with passages receiving said rods, each of said members being formed at the respective passage with a pair of hollow dome elements converging toward free ends thereof, said dome elements defining slits opening longitudinally at free ends of the dome elements and being surrounded by a clamping element in the form of a spring ring.

12. The headrest defined in claim 11 wherein said spring ring is received in peripheral grooves of said dome elements.

13. The headrest defined in claim 1 wherein said strips are each formed from a pair of mirror-symmetrical half-shell strip segments having first ends hooked together and radially outwardly extending second ends.

14. The headrest defined in claim 13 wherein one of said first ends is bent outwardly and foreshortened and the other first end is bent over said one of said first ends and has a channel receiving and edge thereof.

15. The headrest defined in claim 13 wherein said second ends are shanks of a U having a bight interconnecting them.

16. The headrest defined in claim 15 wherein said bight is located diametrically opposite a zone at which said first ends are hooked together.

17. A headrest for use in an automotive vehicle and adapted to be supported therein upon support rods, said headrest comprising:
   a headrest frame;
   a headrest body on said frame;
   a pair of pivot members received in said body, engaged by said rods and formed with respective brake stubs, said pivot members defining a pivot axis about which the headrest body and frame are limitedly pivotal relative to said rods, said brakes stubs being centered on said axis;
   at least one resilient strip held nonrotatably in said frame and forming a brakeshoe braced against each of said brake stubs and shaped to extend over at least a major portion of a periphery thereof for preventing unintentional angular displacement of said body relative to said pivot members, said strip being composed of spring steel or synthetic resin material, said strip being formed with diametrically oppositely disposed pairs of inwardly projecting indexing formations alternatively engageable in detent recesses formed in the periphery of the respective brake stub.

* * * * *